United States Patent
Shah et al.

(10) Patent No.: US 7,972,497 B2
(45) Date of Patent: *Jul. 5, 2011

(54) PROCESS TO PREPARE A HEAT TRANSFER OIL

(75) Inventors: Ravindra Shah, Concord, CA (US); John M. Rosenbaum, Richmond, CA (US); Nancy J. Bertrand, Lafayette, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/504,556

(22) Filed: Jul. 16, 2009

(65) Prior Publication Data

US 2009/0278077 A1  Nov. 12, 2009

Related U.S. Application Data

(62) Division of application No. 11/535,165, filed on Sep. 26, 2006, now abandoned.

(51) Int. Cl.
C10G 45/00 (2006.01)
C10M 101/00 (2006.01)

(52) U.S. Cl. .............. 208/27; 208/28; 208/33; 208/34; 208/35; 208/36; 208/18; 208/19

(58) Field of Classification Search .............. 208/28; 252/68
See application file for complete search history.

(56) References Cited

U.S. PATENT DOCUMENTS

| | | | |
|---|---|---|---|
| 4,678,860 A | 7/1987 | Kuester et al. | |
| 5,378,349 A | 1/1995 | Senn | |
| 5,466,364 A | 11/1995 | Kaul et al. | |
| 7,045,055 B2 | 5/2006 | Ziemer et al. | |
| 7,195,706 B2 | 3/2007 | Abernathy et al. | |
| 7,282,134 B2 | 10/2007 | Abernathy et al. | |
| 7,374,658 B2 | 5/2008 | Rosenbaum et al. | |
| 7,425,524 B2 | 9/2008 | Haire et al. | |
| 7,435,328 B2 | 10/2008 | Rosenbaum et al. | |
| 7,473,346 B2 | 1/2009 | Rosenbaum et al. | |
| 2005/0133407 A1* | 6/2005 | Abernathy et al. | ............. 208/18 |
| 2005/0133408 A1 | 6/2005 | Abernathy et al. | |
| 2006/0261145 A1 | 11/2006 | Robertson et al. | |
| 2006/0289337 A1 | 12/2006 | Rosenbaum et al. | |

(Continued)

OTHER PUBLICATIONS

High Flash & Fire Points, Thermally Stable Engineering Bulletin HE 302, Paratherm HE, 2002, Paratherm Corporation.
U.S. Appl. No. 11/296,636, Manual Transmission Fluid Made With Lubricating Base Oil Having High Monocycloparaffins and Low Multicycloparaffins, Filed Dec. 7, 2005.
12/504.585 Advisory Action, Mail Date Oct. 12, 2010.

*Primary Examiner* — Ellen M McAvoy
*Assistant Examiner* — Taiwo Oladapo
(74) *Attorney, Agent, or Firm* — Susan M. Abernathy

(57) ABSTRACT

A process to prepare a heat transfer oil, comprising:
a. dewaxing a substantially paraffinic wax feed by hydroisomerization dewaxing using a shape selective intermediate pore size molecular sieve under hydroisomerization conditions including a defined hydrogen to feed ratio, whereby a lubricating base oil is produced,
b. selecting one or more fractions of the lubricating base oil having:
   i. a low pour point,
   ii. greater than 10 weight percent and less than 70 weight percent total molecules with cycloparaffinic functionality, wherein the one or more fractions have at least 31.2 wt % 1-unsaturations by FIMS, and
   iii. a ratio of weight percent molecules with monocycloparaffinic functionality to weight percent molecules with multicycloparaffinic functionality greater than 15; and
c. blending the one or more fractions of the lubricating base oil with less than 0.2 wt % antifoam agent to prepare the heat transfer oil of a defined ISO viscosity grade.

20 Claims, 3 Drawing Sheets

U.S. PATENT DOCUMENTS

| | | |
|---|---|---|
| 2006/0293193 A1 | 12/2006 | Rosenbaum et al. |
| 2007/0142240 A1 | 6/2007 | Loh et al. |
| 2007/0142250 A1 | 6/2007 | Loh et al. |
| 2007/0238627 A1 | 10/2007 | Haire et al. |

* cited by examiner

US 7,972,497 B2

PROCESS TO PREPARE A HEAT TRANSFER OIL

This application is a divisional of U.S. patent application Ser. No. 11/535,165, filed on Sep. 26, 2006. It relates to two co-filed patent applications titled "Method of Using Heat Transfer Oil Having High Auto Ignition Temperature" and "Heat Transfer Oil Comprising a Base Oil Having a Low Traction Coefficient."

FIELD OF THE INVENTION

This invention is directed to a process to prepare a heat transfer oil.

BACKGROUND OF THE INVENTION

Heat transfer oils should never be used above their auto ignition temperature (AIT). AIT is the temperature at which the fluid will ignite spontaneously in contact with air. Highly paraffinic heat transfer oils such as Caloria HT43, Mobiltherm 603, and Duratherm 630 have AITs of 632° F., 670° F., and 693° F., respectively. These known heat transfer oils are made with highly refined, severely hydrotreated, petroleum-based paraffin oils that do not have the high viscosity index and preferred molecular composition that are desired. Conventional heat transfer oils made by Chevron using petroleum derived neutral oils have AIT's of approximately 599° F. A heat transfer oil, made using a base oil made from a waxy feed, and having a higher auto ignition temperature and higher viscosity index is desired; and processes to make and use it are also desired.

SUMMARY OF THE INVENTION

We have invented a heat transfer oil, comprising a base oil made from a waxy feed. The base oil has a pour point less than −9° C., less than 0.3 wt % aromatics, greater than 10 weight percent and less than 70 weight percent total molecules with cycloparaffinic functionality, and a ratio of molecules with monocycloparaffinic functionality to molecules with multicycloparaffinic functionality greater than 15. The heat transfer oil has an AIT greater than 329° C. (625° F.), a viscosity index greater than 28×Ln(Kinematic Viscosity at 100° C., in cSt), and is selected from the group consisting of ISO 10, ISO 15, ISO 22, ISO 46, ISO 68, ISO 100, ISO 150, and ISO 220.

We have also invented a process to prepare a heat transfer oil, comprising: dewaxing a substantially paraffinic wax feed by hydroisomerization dewaxing using a shape selective intermediate pore size molecular sieve under hydroisomerization conditions including a hydrogen to feed ratio from about 712.4 to about 3562 liter H$_2$/liter oil (about 4 to about 20 MSCF/bbl), whereby a lubricating base oil is produced,
 a. selecting one or more fractions of the lubricating base oil having:
  i. a pour point less than −9° C.,
  ii. greater than 10 weight percent and less than 70 weight percent total molecules with cycloparaffinic functionality, and
  iii. a ratio of weight percent molecules with monocycloparaffinic functionality to weight percent molecules with multicycloparaffinic functionality greater than 15; and
 b. blending the one or more fractions of the lubricating base oil with less than 0.2 wt % antifoam agent to prepare the heat transfer oil of an ISO viscosity grade selected from the group of ISO 10, ISO 15, ISO 22, ISO 46, ISO 68, ISO 100, ISO 150, and ISO 220.

We have also invented a method to use a heat transfer oil, comprising:
 a. selecting a heat transfer oil having an auto ignition temperature greater than 329° C. (625° F.) and a viscosity index greater than 28×Ln(Kinematic Viscosity at 100° C., in cSt)+80; wherein the heat transfer oil comprises a base oil, made from a waxy feed, having:
  i. greater than 10 weight percent and less than 70 weight percent total molecules with cycloparaffinic functionality;
 b. providing the heat transfer oil to a mechanical system; and
 c. transferring heat in the mechanical system from a heat source to a heat sink.

In another embodiment, we have invented a heat transfer oil, comprising:
 a. an isomerized Fischer-Tropsch derived base oil fraction have a traction coefficient less than or equal to 0.015, when measured at a kinematic viscosity of 15 cSt and at a slide to roll ratio of 40 percent; and
 b. an antifoam agent;
wherein the heat transfer oil has an auto ignition temperature greater than 329° C. (625° F.) and an ASTM Color less than 0.5.

DETAILED DESCRIPTION OF THE INVENTION

Figure 1:
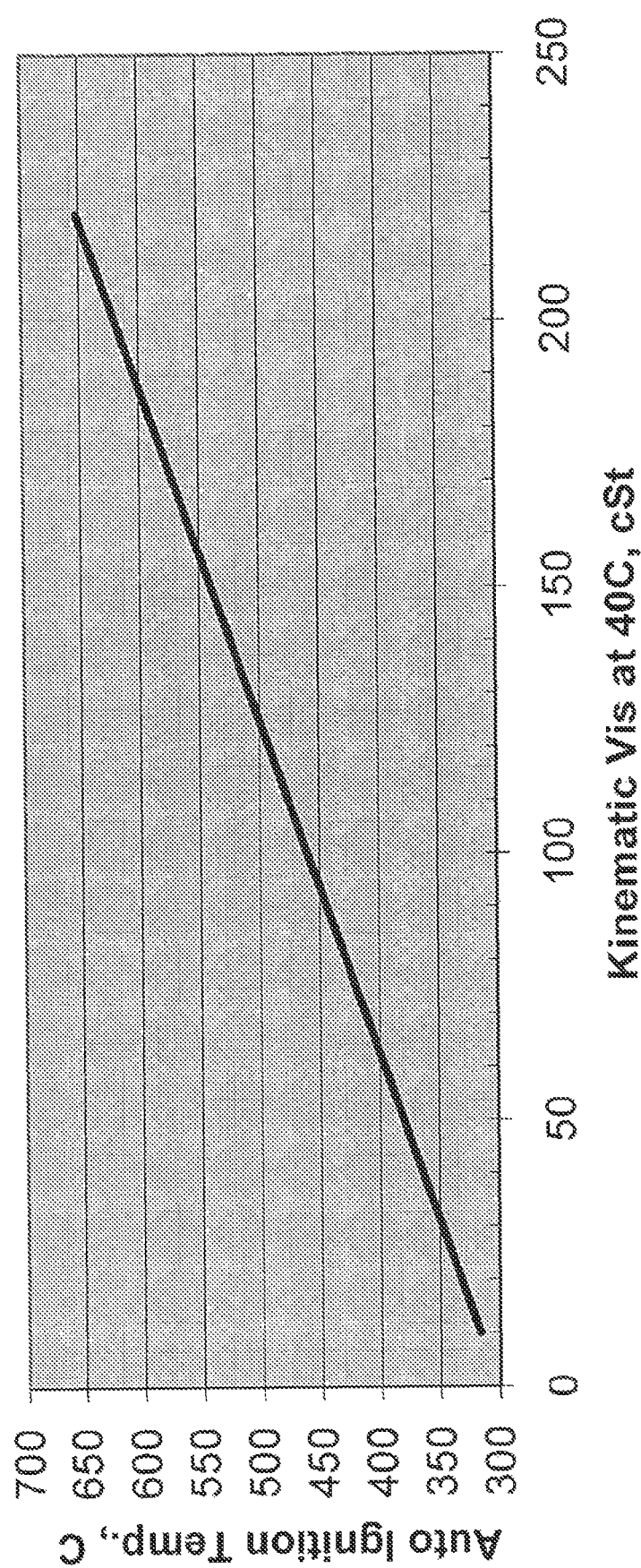
FIG. 1 illustrates the plot of Kinematic Viscosity at 40° C. in cSt vs. Auto Ignition Temperature by ASTM E659-78 (Reapproved 2005) in degrees Celsius. It shows the line for the auto ignition temperature equal to 1.6×(Kinematic Viscosity at 40° C.)+300.

We have discovered that heat transfer oils made using base oil having low pour point, low aromatic content, defined cycloparaffinic content, and a high ratio of monocycloparaffins to multicycloparaffins have an exceptionally high viscosity index (VI) and auto ignition temperature (AIT). In addition, they have comparable Ramsbottom carbon residues, and improved simulated distillation profiles.

Weight percent Ramsbottom carbon residue is measured by ASTM D 524-04. The carbon residue is the residue formed by evaporation and thermal degradation of a carbon containing material. A low Ramsbottom carbon residue is an indication of the relative coke-forming propensity of a heat transfer oil, and is desired to be as low as possible in the heat transfer oil while still retaining a low auto ignition temperature.

The term "Ln" in the context of equations in this disclosure refers to the natural logarithm with base 'e'. The terms "Fischer-Tropsch derived" or "FT derived" means that the product, fraction, or feed originates from or is produced at some stage by a Fischer-Tropsch process. The term "substantially paraffinic" means containing a high level of n-paraffins, generally greater than 40 wt %, preferably greater than 50 wt %, more preferably greater than 75 wt %.

The feedstock for the Fischer-Tropsch process may come from a wide variety of hydrocarbonaceous resources, including biomass, natural gas, coal, shale oil, petroleum, municipal waste, derivatives of these, and combinations thereof.

Slack wax can be obtained from conventional petroleum derived feedstocks by either hydrocracking or by solvent refining of the lube oil fraction. Typically, slack wax is recovered from solvent dewaxing feedstocks prepared by one of these processes. Hydrocracking is usually preferred because hydrocracking will also reduce the nitrogen content to a low value. With slack wax derived from solvent refined oils, deoiling may be used to reduce the nitrogen content. Hydrotreating of the slack wax can be used to lower the nitrogen and sulfur content. Slack waxes posses a very high viscosity index, normally in the range of from about 140 to 200, depending on the oil content and the starting material from which the slack wax was prepared. Therefore, slack waxes are suitable for the preparation of base oils made from a waxy feed used in the heat transfer oils of this invention.

The waxy feed useful in this invention preferably has less than 25 ppm total combined nitrogen and sulfur. Nitrogen is measured by melting the waxy feed prior to oxidative combustion and chemiluminescence detection by ASTM D 4629-02. The test method is further described in U.S. Pat. No. 6,503,956, incorporated herein. Sulfur is measured by melting the waxy feed prior to ultraviolet fluorescence by ASTM D 5453-00. The test method is further described in U.S. Pat. No. 6,503,956, incorporated herein.

Determination of normal paraffins (n-paraffins) in wax-containing samples should use a method that can determine the content of individual C7 to C110 n-paraffins with a limit of detection of 0.1 wt %. The preferred method used is described later in this disclosure.

Waxy feeds useful in this invention are expected to be plentiful and relatively cost competitive in the near future as large-scale Fischer-Tropsch synthesis processes come into production. Syncrude prepared from the Fischer-Tropsch process comprises a mixture of various solid, liquid, and gaseous hydrocarbons. Those Fischer-Tropsch products which boil within the range of lubricating base oil contain a high proportion of wax which makes them ideal candidates for processing into base oil. Accordingly, Fischer-Tropsch wax represents an excellent feed for preparing high quality base oils according to the process of the invention. Fischer-Tropsch wax is normally solid at room temperature and, consequently, displays poor low temperature properties, such as pour point and cloud point. However, following hydroisomerization of the wax, Fischer-Tropsch derived base oils having excellent low temperature properties may be prepared. A general description of suitable hydroisomerization dewaxing processes may be found in U.S. Pat. Nos. 5,135,638 and 5,282,958; and US Patent Application 20050133409, incorporated herein.

The hydroisomerization is achieved by contacting the waxy feed with a hydroisomerization catalyst in an isomerization zone under hydroisomerizing conditions. The hydroisomerization catalyst preferably comprises a shape selective intermediate pore size molecular sieve, a noble metal hydrogenation component, and a refractory oxide support. The shape selective intermediate pore size molecular sieve is preferably selected from the group consisting of SAPO-11, SAPO-31, SAPO-41, SM-3, ZSM-22, ZSM-23, ZSM-35, ZSM-48, ZSM-57, SSZ-32, offretite, ferrierite, and combinations thereof. SAPO-11, SM-3, SSZ-32, ZSM-23, and combinations thereof are more preferred. Preferably the noble metal hydrogenation component is platinum, palladium, or combinations thereof.

The hydroisomerizing conditions depend on the waxy feed used, the hydroisomerization catalyst used, whether or not the catalyst is sulfided, the desired yield, and the desired properties of the base oil. Preferred hydroisomerizing conditions useful in the current invention include temperatures of 260 degrees C. to about 413 degrees C. (500 to about 775 degrees F.), a total pressure of 15 to 3000 psig, and a hydrogen to feed ratio from about 2 to 30 MSCF/bbl, preferably from about 4 to 20 MSCF/bbl (about 712.4 to about 3562 liter $H_2$/liter oil), more preferably from about 4.5 or 5 to about 10 MSCF/bbl, most preferably from about 5 to about 8 MSCF/bbl. Generally, hydrogen will be separated from the product and recycled to the isomerization zone. Note that a feed rate of 10 MSCF/bbl is equivalent to 1781 liter H2/liter feed. Generally, hydrogen will be separated from the product and recycled to the isomerization zone.

Optionally, the base oil produced by hydroisomerization dewaxing may be hydrofinished. The hydrofinishing may occur in one or more steps, either before or after fractionating of the base oil into one or more fractions. The hydrofinishing is intended to improve the oxidation stability, UV stability, and appearance of the product by removing aromatics, olefins, color bodies, and solvents. A general description of hydrofinishing may be found in U.S. Pat. Nos. 3,852,207 and 4,673,487, incorporated herein. The hydrofinishing step may be needed to reduce the weight percent olefins in the base oil to less than 10, preferably less than 5 or 2, more preferably less than 1, even more preferably less than 0.5, and most preferably less than 0.05 or 0.01. The hydrofinishing step may also be needed to reduce the weight percent aromatics to less than 0.3 or 0.1, preferably less than 0.05, more preferably less than 0.02, and most preferably less than 0.01.

The lubricating base oil is typically separated into fractions, whereby one or more of the fractions will have a pour point less than −9° C., a total weight percent of molecules with cycloparaffinic functionality greater than 10, and a ratio of weight percent molecules with monocycloparaffinic functionality to weight percent molecules with multicycloparaffinic functionality greater than 15. The base oil is optionally fractionated into different viscosity grades of base oil. In the context of this disclosure "different viscosity grades of base oil" is defined as two or more base oils differing in kinematic viscosity at 100 degrees C. from each other by at least 1.0 cSt. Kinematic viscosity is measured using ASTM D 445-04. Fractionating is done using a vacuum distillation unit to yield cuts with pre selected boiling ranges. One of the fractions may be a distillation bottoms product.

The base oil fractions will typically have a pour point less than zero degrees C. Preferably the pour point will be less than −9 degrees C. Additionally, in some embodiments the pour point of the base oil fraction will have a ratio of pour point, in degrees C., to the kinematic viscosity at 100 degrees C., in cSt, greater than a Base Oil Pour Factor, where the Base Oil Pour Factor is defined by the equation: Base Oil Pour Factor=7.35×Ln(Kinematic Viscosity at 100° C.)−18. Pour point is measured by ASTM D 5950-02.

The base oil fractions have measurable quantities of unsaturated molecules measured by FIMS. In a preferred embodiment the hydroisomerization dewaxing and fractionating conditions in the process of this invention are tailored to produce one or more selected fractions of base oil having greater than 10 weight percent total molecules with cycloparaffinic functionality, preferably greater than 20 weight percent, more preferably greater than 35 or greater than 40; and a viscosity index greater than 150. The one or more selected fractions of base oils will usually have less than 70 weight percent total molecules with cycloparaffinic functionality. Preferably the one or more selected fractions of base oil will additionally have a ratio of molecules with monocycloparaffinic functionality to molecules with multicycloparaffinic functionality greater than 2.1, more preferably greater than 15. In some preferred embodiments there may be no molecules with multicycloparaffinic functionality, such that the ratio of molecules with monocycloparaffinic functionality to molecules with multicycloparaffinic functionality is greater than 100.

Figure 3:
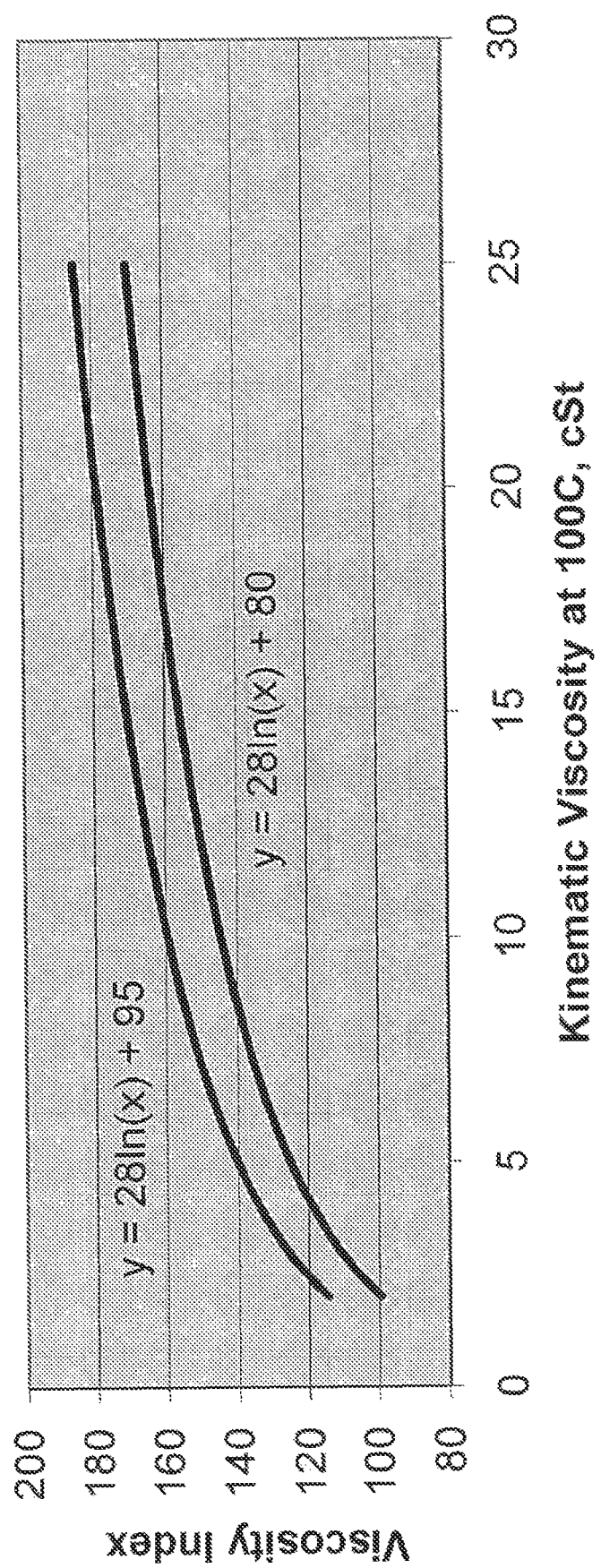
FIG. 3 illustrates the plots of Kinematic Viscosity at 100° C. in cSt vs. two preferred viscosity index lines, one being the equation for viscosity index equal to 28×Ln(Kinematic Viscosity at 100° C.)+80 and the other being the equation for viscosity index equal to 28×Ln(Kinematic Viscosity at 100° C.)+95.

The viscosity indexes of the lubricating base oils used in the heat transfer oils of this invention will be high. They will generally have viscosity indexes greater than 28×Ln(Kinematic Viscosity at 100° C.)+80. In a preferred embodiment they will have viscosity indexes greater than 28×Ln(Kinematic Viscosity at 100° C.)+95. Plots for the lines that define the two lower limits for the viscosity indexes described above are shown in FIG. 3. For example a 4.5 cSt oil will have a viscosity index greater than 122, preferably greater than 137; and a 6.5 cSt oil will have a viscosity index greater than 132, preferably greater than 147. The test method used to measure viscosity index is ASTM D 2270-04.

The presence of predominantly cycloparaffinic molecules with monocycloparaffinic functionality in the base oil fractions of this invention provides excellent oxidation stability, low Noack volatility, as well as desired additive solubility and elastomer compatibility. The base oil fractions have a weight percent olefins less than 10, preferably less than 5, more preferably less than 1, even more preferably less than 0.5, and most preferably less than 0.05 or 0.01. The base oil fractions preferably have a weight percent aromatics less than 0.1, more preferably less than 0.05, and most preferably less than 0.02. Heat transfer oils made with a base oil with low olefin and aromatic contents would also have higher oxidation stabilities and should give longer service lives than heat transfer oils made with other paraffinic base oils.

In preferred embodiments, the base oil fractions have a traction coefficient less than 0.023, preferably less than or equal to 0.021, more preferably less than or equal to 0.019, when measured at a kinematic viscosity of 15 cSt and at a slide to roll ratio of 40 percent. Preferably they have a traction coefficient less than an amount defined by the equation: traction coefficient=0.009×Ln(Kinematic Viscosity)−0.001, wherein the Kinematic Viscosity during the traction coefficient measurement is between 2 and 50 cSt; and wherein the traction coefficient is measured at an average rolling speed of 3 meters per second, a slide to roll ratio of 40 percent, and a load of 20 Newtons. In one embodiment the base oil fractions have a traction coefficient less than 0.015 or 0.011, when measured at a kinematic viscosity of 15 cSt and at a slide to roll ratio of 40 percent. Examples of these preferred base oil fractions with low traction coefficients are taught in U.S. Pat. No. 7,045,055 and U.S. patent application Ser. No. 11/400,570, filed Apr. 7, 2006.

In preferred embodiments, where the olefin and aromatics contents are significantly low in the lubricant base oil fraction of the lubricating oil, the Oxidator BN of the selected base oil fraction will be greater than 25 hours, preferably greater than 35 hours, more preferably greater than 40 or even 41 hours. The Oxidator BN of the selected base oil fraction will typically be less than 65 hours. Oxidator BN is a convenient way to measure the oxidation stability of base oils. The Oxidator BN test is described by Stangeland et al. in U.S. Pat. No. 3,852,207. The Oxidator BN test measures the resistance to oxidation by means of a Domte-type oxygen absorption apparatus. See R. W. Dornte "Oxidation of White Oils," Industrial and Engineering Chemistry, Vol. 28, page 26, 1936. Normally, the conditions are one atmosphere of pure oxygen at 340° F. The results are reported in hours to absorb 1000 ml of O2 by 100 g. of oil. In the Oxidator BN test, 0.8 ml of catalyst is used per 100 grams of oil and an additive package is included in the oil. The catalyst is a mixture of soluble metal naphthenates in kerosene. The mixture of soluble metal naphthenates simulates the average metal analysis of used crankcase oil. The level of metals in the catalyst is as follows: Copper=6,927 ppm; Iron=4,083 ppm; Lead=80,208 ppm Manganese=350 ppm; Tin=3565 ppm. The additive package is 80 millimoles of zinc bispolypropylenephenyldithio-phosphate per 100 grams of oil, or approximately 1.1 grams of OLOA 260. The Oxidator BN test measures the response of a lubricating base oil in a simulated application. High values, or long times to absorb one liter of oxygen, indicate good oxidation stability.

OLOA is an acronym for Oronite Lubricating Oil Additive®, which is a registered trademark of Chevron Oronite.

Antifoam Agent:

Foam tendency and stability are measured by ASTM D 892-03. ASTM D 892-03 measures the foaming characteristics of a lubricating base oil or finished lubricant at 24 degrees C. and 93.5 degrees C. It provides a means of empirically rating the foaming tendency and stability of the foam. The test oil, maintained at a temperature of 24 degrees C., is blown with air at a constant rate for 5 minutes then allowed to settle for 10 minutes. The volume of foam, in ml, is measured at the end of both periods (sequence I). The foaming tendency is provided by the first measurement, the foam stability by the second measurement. The test is repeated using a new portion of the test oil at 93.5 degrees C. (sequence II); however the settling time is reduced to one minute. For ASTM D 892-03 sequence III the same sample is used from sequence II, after the foam has collapsed and cooled to 24 degrees C. The test oil is blown with dry air for 5 minutes, and then settled for 10 minutes. The foam tendency and stability are again measured, and reported in ml. A good quality heat transfer oil will generally have less than 100 ml foam tendency for each of sequence I, II, and III; and zero ml foam stability for each of sequence I, II, III; the lower the foam tendency of a lubricating base oil or heat transfer oil the better. The heat transfer oils of this invention have much lower foaming tendency than typical heat transfer oils. They preferably have a sequence I foam tendency less than 50 ml; they have a sequence II foam tendency less than 50 ml, preferably less than 30 ml; and they preferably have a sequence III foam tendency less than 50 ml.

Foaming will vary in different base oils but can be controlled by the addition of antifoam agents. Generally, the heat transfer oils of this invention will be blended little to no antifoam agent, typically less than 0.2 wt %. However, heat transfer oils of a higher viscosity or additionally comprising other base oils may exhibit foaming. Examples of antifoam agents are silicone oils, polyacrylates, acrylic polymers, and fluorosilicones.

Antifoam agents work by destabilizing the liquid film that surrounds entrained air bubbles. To be effective they must spread effectively at the air/liquid interface. According to theory, the antifoam agent will spread if the value of the spreading coefficient, S, is positive. S is defined by the following equation: $S = p1 - p2 - p1,2$, wherein p1 is the surface tension of the foamy liquid, p2 is the surface tension of the antifoam agent, and p1,2 is the interfacial tension between them. Surface tension and interfacial tensions are measured using a ring type tensiometer by ASTM D 1331-89 (Reapproved 2001), "Surface and Interfacial Tension of Solutions of Surface-Active Agents". With respect to the current invention, p1 is the surface of the heat transfer oil prior to the addition of antifoam agent.

Preferred choices of antifoam agents in the heat transfer oils of this invention are antifoam agents that when blended into the heat transfer oil will exhibit spreading coefficients of at least 2 mM/m at both 24 degrees C. and 93.5 degrees C. Various types of antifoam agents are taught in U.S. Pat. No. 6,090,758. When used, the antifoam agents should not significantly increase the air release time of the heat transfer oil. One preferred antifoam agent is high molecular weight polydimethyl siloxane, a type of silicone antifoam agent. Another preferred choice of antifoam agent in the heat transfer oils of this invention are acrylate antifoam agents, as they are less likely to adversely effect air release properties compared to lower molecular weight silicone antifoam agents.

Figure 2:
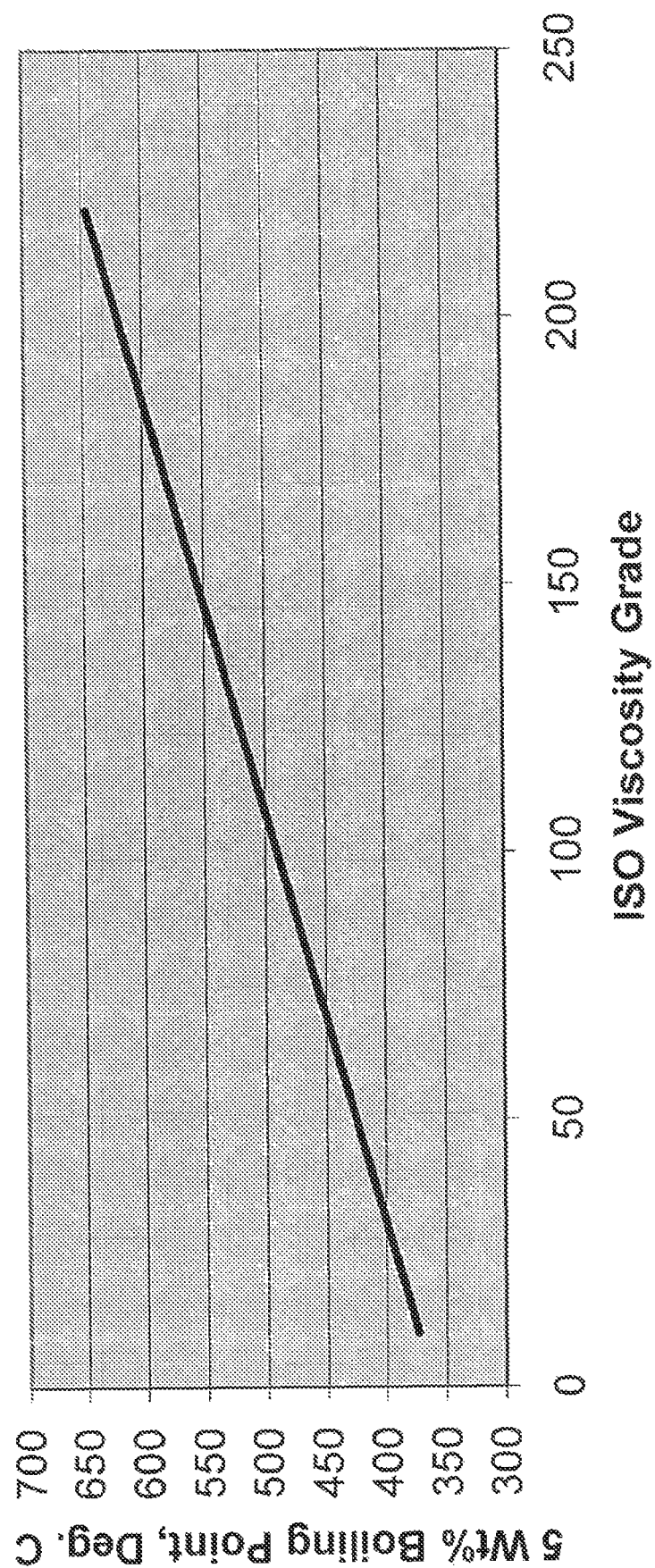
FIG. 2 illustrates the plot of ISO Viscosity Grade vs. 5 wt % boiling point by ASTM D6352-04, in degrees Celsius. It shows the line for the 5 wt % boiling point equal to 1.3×(ISO Viscosity Grade)+360.

The heat transfer oils of this invention may have ISO viscosity grades of 10 to 220. The ISO viscosity grades are defined by ASTM D 2422-97 (Reapproved 2002). The heat transfer oils of this invention also have 5 wt % boiling points relative to their ISO viscosity grades that are higher than other earlier known paraffinic type heat transfer oils. In one preferred embodiment the heat transfer oil will have a 5 wt % boiling point greater than 1.3×(ISO Grade of Heat Transfer Oil)+360, in ° C. A plot of the line defining this preferred lower limit of the 5 wt % boiling point of this embodiment of the heat transfer oils of this invention is shown in FIG. 2. More preferably, for example, an ISO 22 heat transfer oil will have a 5 wt % boiling point greater than 389° C. (732° F.), an ISO 32 heat transfer oil will have a 5 wt % boiling point greater than 405° C. (761° F.), an ISO 46 heat transfer oil will have a 5 wt % boiling point greater than 440° C. (824° F.), an ISO 68 heat transfer oil will have a 5 wt % boiling point greater than 468° C. (875° F.). Preferably an ISO 100 heat transfer oil of this invention will have a 5 wt % boiling point greater than 482° C. (900° F.), more preferably greater than 496° C. (925° F.). Wt % boiling points are determined by ASTM D6352-04.

Embodiments of the heat transfer oils of this invention may also comprise metals or metal oxides dispersed in them, and optionally a dispersant. Metals, and optionally a dispersant, in the composition provide enhanced thermal conductivity based on the presence of fine particles. Preferred metals and dispersants for use in heat transfer oils are taught in U.S. Patent Publication US20060027484. Preferred embodiments of dispersant are anionic dispersant and/or nonionic dispersant, preferably sulfo succinate, alkoxylated polyaromatics, 12-hydroxy stearic acid and/or polyhydroxy stearic acid.

Other additives that may be used in the heat transfer oils of this invention include antioxidants, or mixtures of antioxidants, metal deactivators, and seal and gasket swell agents.

We have invented a method to use a heat transfer oil, comprising selecting a heat transfer oil having an auto ignition temperature greater than 329° C. (625° F.) and a viscosity index greater than 28×Ln(Kinematic Viscosity at 100° C.)+80, wherein the heat transfer oil comprises a base oil made from a waxy feed, providing the heat transfer oil to a mechanical system, and transferring heat in the mechanical system from a heat source to a heat sink.

Examples of mechanical systems where the use of the heat transfer oil of this invention with an especially high auto ignition temperature are valuable are heat pumps, batch reactors (especially constant heat flux batch reactors), refrigerators, air conditioners, chemical & pharmaceutical manufacturing equipment, and secondary loop systems.

Specific Analytical Test Methods:

Wt % Normal Paraffins in Wax-Containing Samples:

Quantitative analysis of normal paraffins in wax-containing samples is determined by gas chromatography (GC). The GC (Agilent 6890 or 5890 with capillary split/splitless inlet and flame ionization detector) is equipped with a flame ionization detector, which is highly sensitive to hydrocarbons. The method utilizes a methyl silicone capillary column, routinely used to separate hydrocarbon mixtures by boiling point. The column is fused silica, 100% methyl silicone, 30 meters length, 0.25 mm ID, 0.1 micron film thickness supplied by Agilent. Helium is the carrier gas (2 ml/min) and hydrogen and air are used as the fuel to the flame.

The waxy feed is melted to obtain a 0.1 g homogeneous sample. The sample is immediately dissolved in carbon disulfide to give a 2 wt % solution. If necessary, the solution is heated until visually clear and free of solids, and then injected into the GC. The methyl silicone column is heated using the following temperature program:

Initial temp: 150° C. (If C7 to C15 hydrocarbons are present, the initial temperature is 50° C.)
Ramp: 6° C. per minute
Final Temp: 400° C.
Final hold: 5 minutes or until peaks no longer elute The column then effectively separates, in the order of rising carbon number, the normal paraffins from the non-normal paraffins. A known reference standard is analyzed in the same manner to establish elution times of the specific normal-paraffin peaks. The standard is ASTM D2887 n-paraffin standard, purchased from a vendor (Agilent or Supelco), spiked with 5 wt % Polywax 500 polyethylene (purchased from Petrolite Corporation in Oklahoma). The standard is melted prior to injection. Historical data collected from the analysis of the reference standard also guarantees the resolving efficiency of the capillary column.

If present in the sample, normal paraffin peaks are well separated and easily identifiable from other hydrocarbon types present in the sample. Those peaks eluting outside the retention time of the normal paraffins are called non-normal paraffins. The total sample is integrated using baseline hold from start to end of run. N-paraffins are skimmed from the total area and are integrated from valley to valley. All peaks detected are normalized to 100%. EZChrom is used for the peak identification and calculation of results.

Wt % Olefins:

The Wt % Olefins in the base oils of this invention is determined by proton-NMR by the following steps, A-D:

A. Prepare a solution of 5-10% of the test hydrocarbon in deuterochloroform.

B. Acquire a normal proton spectrum of at least 12 ppm spectral width and accurately reference the chemical shift (ppm) axis. The instrument must have sufficient gain range to acquire a signal without overloading the receiver/ADC. When a 30 degree pulse is applied, the instrument must have a minimum signal digitization dynamic range of 65,000. Preferably the dynamic range will be 260,000 or more.

C. Measure the integral intensities between:
6.0-4.5 ppm (olefin)
2.2-1.9 ppm (allylic)
1.9-0.5 ppm (saturate)

D. Using the molecular weight of the test substance determined by ASTM D 2503, calculate:
1. The average molecular formula of the saturated hydrocarbons
2. The average molecular formula of the olefins
3. The total integral intensity (=sum of all integral intensities)

4. The integral intensity per sample hydrogen (=total integral/number of hydrogens in formula)
5. The number of olefin hydrogens (=Olefin integral/integral per hydrogen)
6. The number of double bonds (=Olefin hydrogen times hydrogens in olefin formula/2)
7. The wt % olefins by proton NMR=100 times the number of double bonds times the number of hydrogens in a typical olefin molecule divided by the number of hydrogens in a typical test substance molecule.

The wt % olefins by proton NMR calculation procedure, D, works best when the % olefins result is low, less than about 15 weight percent. The olefins must be "conventional" olefins; i.e. a distributed mixture of those olefin types having hydrogens attached to the double bond carbons such as: alpha, vinylidene, cis, trans, and trisubstituted. These olefin types will have a detectable allylic to olefin integral ratio between 1 and about 2.5. When this ratio exceeds about 3, it indicates a higher percentage of tri or tetra substituted olefins are present and that different assumptions must be made to calculate the number of double bonds in the sample.

Aromatics Measurement by HPLC-UV:

The method used to measure low levels of molecules with at least one aromatic function in the lubricant base oils of this invention uses a Hewlett Packard 1050 Series Quaternary Gradient High Performance Liquid Chromatography (HPLC) system coupled with a HP 1050 Diode-Array UV-Vis detector interfaced to an HP Chem-station. Identification of the individual aromatic classes in the highly saturated Base oils was made on the basis of their UV spectral pattern and their elution time. The amino column used for this analysis differentiates aromatic molecules largely on the basis of their ring-number (or more correctly, double-bond number). Thus, the single ring aromatic containing molecules elute first, followed by the polycyclic aromatics in order of increasing double bond number per molecule. For aromatics with similar double bond character, those with only alkyl substitution on the ring elute sooner than those with naphthenic substitution.

Unequivocal identification of the various base oil aromatic hydrocarbons from their UV absorbance spectra was accomplished recognizing that their peak electronic transitions were all red-shifted relative to the pure model compound analogs to a degree dependent on the amount of alkyl and naphthenic substitution on the ring system. These bathochromic shifts are well known to be caused by alkyl-group delocalization of the π-electrons in the aromatic ring. Since few unsubstituted aromatic compounds boil in the lubricant range, some degree of red-shift was expected and observed for all of the principle aromatic groups identified.

Quantitation of the eluting aromatic compounds was made by integrating chromatograms made from wavelengths optimized for each general class of compounds over the appropriate retention time window for that aromatic. Retention time window limits for each aromatic class were determined by manually evaluating the individual absorbance spectra of eluting compounds at different times and assigning them to the appropriate aromatic class based on their qualitative similarity to model compound absorption spectra. With few exceptions, only five classes of aromatic compounds were observed in highly saturated API Group II and III lubricant base oils.

HPLC-UV Calibration:

HPLC-UV is used for identifying these classes of aromatic compounds even at very low levels. Multi-ring aromatics typically absorb 10 to 200 times more strongly than single-ring aromatics. Alkyl-substitution also affected absorption by about 20%. Therefore, it is important to use HPLC to separate and identify the various species of aromatics and know how efficiently they absorb.

Five classes of aromatic compounds were identified. With the exception of a small overlap between the most highly retained alkyl-1-ring aromatic naphthenes and the least highly retained alkyl naphthalenes, all of the aromatic compound classes were baseline resolved. Integration limits for the co-eluting 1-ring and 2-ring aromatics at 272 nm were made by the perpendicular drop method. Wavelength dependent response factors for each general aromatic class were first determined by constructing Beer's Law plots from pure model compound mixtures based on the nearest spectral peak absorbances to the substituted aromatic analogs.

For example, alkyl-cyclohexylbenzene molecules in base oils exhibit a distinct peak absorbance at 272 nm that corresponds to the same (forbidden) transition that unsubstituted tetralin model compounds do at 268 nm. The concentration of alkyl-1-ring aromatic naphthenes in base oil samples was calculated by assuming that its molar absorptivity response factor at 272 nm was approximately equal to tetralin's molar absorptivity at 268 nm, calculated from Beer's law plots. Weight percent concentrations of aromatics were calculated by assuming that the average molecular weight for each aromatic class was approximately equal to the average molecular weight for the whole base oil sample.

This calibration method was further improved by isolating the 1-ring aromatics directly from the lubricant base oils via exhaustive HPLC chromatography. Calibrating directly with these aromatics eliminated the assumptions and uncertainties associated with the model compounds. As expected, the isolated aromatic sample had a lower response factor than the model compound because it was more highly substituted.

More specifically, to accurately calibrate the HPLC-UV method, the substituted benzene aromatics were separated from the bulk of the lubricant base oil using a Waters semi-preparative HPLC unit. 10 grams of sample was diluted 1:1 in n-hexane and injected onto an amino-bonded silica column, a 5 cm×22.4 mm ID guard, followed by two 25 cm×22.4 mm ID columns of 8-12 micron amino-bonded silica particles, manufactured by Rainin Instruments, Emeryville, Calif., with n-hexane as the mobile phase at a flow rate of 18 mls/min. Column eluent was fractionated based on the detector response from a dual wavelength UV detector set at 265 nm and 295 nm. Saturate fractions were collected until the 265 nm absorbance showed a change of 0.01 absorbance units, which signaled the onset of single ring aromatic elution. A single ring aromatic fraction was collected until the absorbance ratio between 265 nm and 295 nm decreased to 2.0, indicating the onset of two ring aromatic elution. Purification and separation of the single ring aromatic fraction was made by re-chromatographing the monoaromatic fraction away from the "tailing" saturates fraction which resulted from overloading the HPLC column.

This purified aromatic "standard" showed that alkyl substitution decreased the molar absorptivity response factor by about 20% relative to unsubstituted tetralin.

Confirmation of Aromatics by NMR:

The weight percent of all molecules with at least one aromatic function in the purified mono-aromatic standard was confirmed via long-duration carbon 13 NMR analysis. NMR was easier to calibrate than HPLC UV because it simply measured aromatic carbon so the response did not depend on the class of aromatics being analyzed. The NMR results were translated from % aromatic carbon to % aromatic molecules (to be consistent with HPLC-UV and D 2007) by knowing that 95-99% of the aromatics in highly saturated lubricant base oils were single-ring aromatics.

High power, long duration, and good baseline analysis were needed to accurately measure aromatics down to 0.2% aromatic molecules.

More specifically, to accurately measure low levels of all molecules with at least one aromatic function by NMR, the standard D 5292-99 method was modified to give a minimum carbon sensitivity of 500:1 (by ASTM standard practice E 386). A 15-hour duration run on a 400-500 MHz NMR with a 10-12 mm Nalorac probe was used. Acorn PC integration software was used to define the shape of the baseline and consistently integrate. The carrier frequency was changed once during the run to avoid artifacts from imaging the aliphatic peak into the aromatic region. By taking spectra on either side of the carrier spectra, the resolution was improved significantly.

Molecular Composition by FIMS:

The lubricant base oils of this invention were characterized by Field Ionization Mass Spectroscopy (FIMS) into alkanes and molecules with different numbers of unsaturations. The distribution of the molecules in the oil fractions was determined by FIMS. The samples were introduced via solid probe, preferably by placing a small amount (about 0.1 mg.) of the base oil to be tested in a glass capillary tube. The capillary tube was placed at the tip of a solids probe for a mass spectrometer, and the probe was heated from about 40 to 50° C. up to 500 or 600° C. at a rate between 50° C. and 100° C. per minute in a mass spectrometer operating at about $10^{-6}$ torr. The mass spectrometer was scanned from m/z 40 to m/z 1000 at a rate of 5 seconds per decade.

The mass spectrometer used was a Micromass Time-of-Flight. Response factors for all compound types were assumed to be 1.0, such that weight percent was determined from area percent. The acquired mass spectra were summed to generate one "averaged" spectrum.

The lubricant base oils of this invention were characterized by FIMS into alkanes and molecules with different numbers of unsaturations. The molecules with different numbers of unsaturations may be comprised of cycloparaffins, olefins, and aromatics. If aromatics were present in significant amounts in the lubricant base oil they would be identified in the FIMS analysis as 4-unsaturations. When olefins were present in significant amounts in the lubricant base oil they would be identified in the FIMS analysis as 1-unsaturations. The total of the 1-unsaturations, 2-unsaturations, 3-unsaturations, 4-unsaturations, 5-unsaturations, and 6-unsaturations from the FIMS analysis, minus the wt % olefins by proton NMR, and minus the wt % aromatics by HPLC-UV is the total weight percent of molecules with cycloparaffinic functionality in the lubricant base oils of this invention. Note that if the aromatics content was not measured, it was assumed to be less than 0.1 wt % and not included in the calculation for total weight percent of molecules with cycloparaffinic functionality.

Molecules with cycloparaffinic functionality mean any molecule that is, or contains as one or more substituents, a monocyclic or a fused multicyclic saturated hydrocarbon group. The cycloparaffinic group may be optionally substituted with one or more substituents. Representative examples include, but are not limited to, cyclopropyl, cyclobutyl, cyclopentyl, cyclohexyl, cycloheptyl, decahydronaphthalene, octahydropentalene, (pentadecan-6-yl)cyclohexane, 3,7,10-tricyclohexylpentadecane, decahydro-1-(pentadecan-6-yl) naphthalene, and the like.

Molecules with monocycloparaffinic functionality mean any molecule that is a monocyclic saturated hydrocarbon group of three to seven ring carbons or any molecule that is substituted with a single monocyclic saturated hydrocarbon group of three to seven ring carbons. The cycloparaffinic group may be optionally substituted with one or more substituents. Representative examples include, but are not limited to, cyclopropyl, cyclobutyl, cyclopentyl, cyclohexyl, cycloheptyl, (pentadecan-6-yl)cyclohexane, and the like.

Molecules with multicycloparaffinic functionality mean any molecule that is a fused multicyclic saturated hydrocarbon ring group of two or more fused rings, any molecule that is substituted with one or more fused multicyclic saturated hydrocarbon ring groups of two or more fused rings, or any molecule that is substituted with more than one monocyclic saturated hydrocarbon group of three to seven ring carbons. The fused multicyclic saturated hydrocarbon ring group preferably is of two fused rings. The cycloparaffinic group may be optionally substituted with one or more substituents. Representative examples include, but are not limited to, decahydronaphthalene, octahydropentalene, 3,7,10-tricyclohexylpentadecane, decahydro-1-(pentadecan-6-yl) naphthalene, and the like.

EXAMPLES

Example 1

A wax sample composed of several different batches of hydrotreated Fischer-Tropsch wax, all made using a Co-based Fischer-Tropsch catalyst was prepared. The different batches of wax composing the wax sample were analyzed and all found to have the properties as shown in Table VIII.

TABLE VIII

| Fischer-Tropsch Wax | |
|---|---|
| Fischer-Tropsch Catalyst | Co-Based |
| Sulfur, ppm | <10 |
| Nitrogen, ppm | <10 |
| Oxygen, wt % | <0.50 |
| Wt % N-Paraffins by GC | >85 |
| D 6352 SIMDIST TBP (WT %), ° F. | |
| T10 | 550-700 |
| T90 | 1000-1080 |
| T90-T10, ° C. | >154 |

The Co-based Fischer-Tropsch wax was hydroisomerized over a Pt/SAPO-11 catalyst with an alumina binder. Operating conditions included temperatures between 635° F. and 675° F. (335° C. and 358° C.), LHSV of 1.0 hr$^{-1}$, reactor pressure of about 500 psig, and once-through hydrogen rates of between 5 and 6 MSCF/bbl. The reactor effluent passed directly to a second reactor containing a Pd on silica-alumina hydrofinishing catalyst also operated at 500 psig. Conditions in the second reactor included a temperature of about 350° F. (177° C.) and an LHSV of 2.0 hr$^{-1}$.

The products boiling above 650° F. were fractionated by vacuum distillation to produce distillate fractions of different viscosity grades. Three Fischer-Tropsch derived lubricant base oils were obtained. Two were distillate side-cut fractions (FT-4.5 and FT-6.4) and one was a distillate bottoms fraction (FT-14). The FIMS analysis was conducted on a Micromass Time-of-Flight spectrophotometer. The emitter on the Micromass Time-of-Flight was a Carbotec 5 um emitter designed for FI operation. A constant flow of pentaflourochlorobenzene, used as lock mass, was delivered into the mass spectrometer via a thin capillary tube. The probe was heated from about 50° C. up to 600° C. at a rate of 100° C. per minute. Test data on the three Fischer-Tropsch derived lubricant base oils are shown in Table II, below.

TABLE II

| Sample Properties | FT-4.5 | FT-6.4 | FT-14 |
|---|---|---|---|
| Viscosity at 100° C., cSt | 4.514 | 6.362 | 13.99 |
| Viscosity Index | 148 | 153 | 157 |
| Pour Point, ° C. | −17 | −23 | −8 |
| D 6352 SIMDIST TBP (WT %), ° F. | | | |
| 5 | 742 | 847 | 963 |
| 10/30 | 755/791 | 856/881 | 972/1006 |
| 50 | 831 | 905 | 1045 |
| 70/90 | 878/938 | 931/962 | 1090/1168 |
| 95 | 957 | 972 | 1203 |
| Wt % Aromatics | 0.0532 | 0.0590 | 0.0414 |
| Wt % Olefins | Not tested | 3.49 | 3.17 |
| FIMS, Wt % | Not tested | | |
| Alkanes | | 68.1 | 59.0 |
| 1-Unsaturations | | 31.2 | 40.2 |
| 2- to 6- Unsaturations | | 0.7 | 0.8 |
| Total | | 100.0 | 100.0 |
| Total Molecules with Cycloparaffinic Functionality | Not tested | 28.3 | 37.8 |
| Ratio of Monocycloparaffins to Multicycloparaffins | Not tested | 39.6 | 46.3 |
| Oxidator BN, hours | Not tested | 21.29 | 18.89 |
| X in the equation: VI = 28 x Ln(VIS100) + X | 105.8 | 101.2 | 83.1 |
| TGA Noack, wt % | 11.9 | 2.8 | 0.7 |

Example 2

Both an ISO 22 and an ISO 46 heat transfer oils were prepared using the base oils described above. The formulations of these two blends are summarized in Table III.

TABLE III

| Component, Wt % | HEATA | HEATB |
|---|---|---|
| Viscosity Grade | ISO 22 | ISO 46 |
| FT-4.5 | 66.69 | 0 |
| FT-6.4 | 33.31 | 77.920 |
| FT-14 | 0 | 22.042 |
| Antifoam Agent | 0 | 0.038 |
| Total | 100.00 | 100.00 |

The properties of these two different heat transfer oil blends are shown in Table IV.

TABLE IV

| Properties | HEATA | HEATB |
|---|---|---|
| Viscosity Grade | ISO 22 | ISO 46 |
| Viscosity at 40° C. cSt | 23.28 | 40.92 |
| Viscosity Index | 151 | 155 |
| Ramsbottom carbon residue, Wt % | 0.03 | 0.03 |
| Auto Ignition, E659, ° F. (° C.) | 655 (346) | 705 (374) |
| D 6352 SIMDIST TBP (WT %), ° F. | | |
| 5 | 753 | 850 |
| 10/30 | 768/823 | 859/888 |
| 50 | 868 | 919 |
| 70/90 | 904/947 | 954/1034 |
| 95 | 962 | 1086 |

HEATA and HEATB are examples of the heat transfer oils of this invention having an auto ignition temperature greater than 625° F. (329° C.). They both comprise a base oil, made from a waxy feed, having a pour point less than −9° C., less than 0.3 wt % aromatics, greater than 10 wt % total molecules with cycloparaffinic functionality, and a ratio of molecules with monocycloparaffinic functionality to molecules with multicycloparaffinic functionality greater than 15, and optionally one or more lubricant additives. Their auto ignition temperatures are both greater than an amount defined by the equation AIT=1.6×(Kinematic Viscosity at 40° C., in cSt)+300, in degrees Celsius. A plot of the line that defines this preferred lower limit of auto ignition temperatures for the heat transfer oils of this invention is shown in FIG. 1.

Example 3

Two comparative heat transfer oil blends, Comp HEATC and Comp HEATD, were made using conventional Group II base oils. Comp HEATE is a typical sample of Duratherm 630, of which the exact formulation is not known other than it contains a number of additives including a dual-stage antioxidant, metal deactivators, antifoam agent, seal & gasket extender, and particle suspension agents. The formulations and properties of these comparison blends are summarized in Table V.

TABLE V

| Component, Wt % | Comp. HEATC ISO 22 | Comp. HEATD ISO 46 | Comp. HEATE ISO 32 |
|---|---|---|---|
| Chevron Neutral Oil 100R | 78.58 | 6.178 | Unknown |
| Chevron Neutral Oil 220R | 21.42 | 93.784 | |
| Antifoam Agent | 0 | 0.038 | |
| Total | 100.00 | 100.00 | |

| Formulation Properties | Comp. HEAT C | Comp. HEAT D | Comp. HEATE |
|---|---|---|---|
| Viscosity Index | 104 | 101 | 122 |
| Ramsbottom carbon residue, Wt % | 0.04 | 0.05 | |
| Auto Ignition, E659, ° F. | 599 | 599 | 693 |
| D 6352 SIMDIST TBP (WT %), ° F. | | | |
| 5 | 647 | | — |
| 10/30 | 685/746 | | 727/— |
| 50 | 786 | | — |
| 70/90 | 831/910 | | — |
| 95 | 956 | | — |

Neither comparative examples HEATC nor HEATD had the high auto ignition temperature of the heat transfer oils of our invention. Comparative sample HEATE, although having a high AIT, had a lower viscosity index and lower 5 wt % boiling point than the heat transfer oils of our invention. Also the comparative sample HEATE, being petroleum derived, did not have the preferred molecular composition of the heat transfer oils of our invention.

Example 4

Three base oils, made by hydroisomerizing paraffinic Co-based Fischer-Tropsch wax over a Pt/SAPO-11 catalyst, hydrotreating, and distillation, were selected for blending into heat transfer oils. The properties of the three base oils are summarized in Table VI, below.

TABLE VI

| Properties | FT-LN | FT-MN | FT-HN |
|---|---|---|---|
| Viscosity at 100° C., cSt | 4.12 | 7.129 | 14.84 |
| Viscosity Index | 138 | 153 | 156 |
| Pour Point, ° C. | −26 | −20 | −12 |
| D 6352 SIMDIST TBP (WT %), ° F. | | | |
| 5 | 758 | 836 | 935 |
| 10/30 | 770/795 | 850/884 | 963/1021 |
| 50 | 813 | 913 | 1060 |
| 70/90 | 832/857 | 947/1004 | 1099/1153 |
| 95 | 867 | 1033 | 1175 |
| Wt % Olefins | 0.32 | 1.38 | 2.00 |
| Oxidator BN, hours | 41.02 | 42.07 | 35.27 |
| X in the equation: VI = 28 x Ln(VIS100) + X | 98.4 | 98.0 | 80.5 |
| Noack, wt % | 10.22 | 2.49 | 1.0 |

All three of these base oils have between 10 and 70 wt % total molecules with cycloparaffinic functionality and a ratio of molecules with monocycloparaffinic functionality to molecules with multicycloparaffinic functionality greater than 15. Note that FT-HN is also an example of an isomerized Fischer-Tropsch derived base oil fraction have a traction coefficient less than or equal to 0.015, when measured at a kinematic viscosity of 15 cSt and at a slide to roll ratio of 40 percent.

Example 5

The three base oils in Example 4 were blended into heat transfer oil oils over a range of ISO viscosity grades from ISO 22 to ISO 100. The formulations and properties of these heat transfer oils are shown in Table VII.

TABLE VII

| Component, Wt % | HEATF ISO 22 | HEATG ISO 46 | HEATH ISO 68 | HEATJ ISO 100 |
|---|---|---|---|---|
| FT-LN | 63.72 | 0.00 | 0.00 | 0.00 |
| FT-MN | 36.28 | 90.995 | 42.784 | 4.348 |
| FT-HN | 0.00 | 8.967 | 57.178 | 95.614 |
| Antifoam Agent | 0.00 | 0.038 | 0.038 | 0.038 |
| Total | 100.000 | 100.000 | 100.000 | 100.000 |
| Formulation Properties | | | | |
| Kinematic Viscosity at 40° C., cSt | 23.19 | 41.13 | 65.75 | 95.28 |
| Kinematic Viscosity at 100° C., cSt | 5.029 | 7.606 | 10.91 | 14.46 |
| Viscosity Index | 150 | 155 | 158 | 157 |
| Ramsbottom carbon residue, Wt % | 0.03 | 0.04 | 0.04 | 0.04 |
| Auto Ignition, E659, ° F. (° C.) | 700 (371) | 685 (363) | 739 (393) | 750 (399) |
| D 6352 SIMDIST TBP (WT %), ° F. | | | | |
| 5 | 766 | 842 | 855 | 908 |
| 10/30 | 780/812 | 858/897 | 877/939 | 946/1018 |
| 50 | 841 | 930 | 1003 | 1062 |
| 70/90 | 880/960 | 969/1040 | 1063/1144 | 1105/1177 |
| 95 | 996 | 1082 | 1186 | 1217 |
| ASTM Color, ASTM D 1500-04a | 0 | 0 | 0 | 0 |

The different grades of heat transfer oil were blended with base oils made from Fischer-Tropsch wax and either with or without 0.038 wt % antifoam agent. In these blends the Fischer-Tropsch derived base oils that were used had weight percent aromatics less than 0.06 and weight percent olefins less than 2.5. The Fischer-Tropsch derived base oils had Oxidator BNs between 30 and 60 hours.

The ISO 22 heat transfer oil had an AIT greater than 357° C. and a 5 wt % boiling point greater than 389° C. (731° F.). The ISO 46 heat transfer oil had an AIT greater than 357° C. and a 5 wt % boiling point greater than 420° C. (788° F.). The ISO 68 heat transfer oil had an AIT greater than 357° C. and a 5 wt % boiling point greater than 448° C. (839° F.). The ISO 100 heat transfer oil had an AIT greater than 357° C. and a 5 wt % boiling point greater than 482° C. (900° F.).

HEATG, HEATH and HEATJ were surprising in that even though they contained a base oil, FT-HN, having a relatively high 50 wt % boiling point (greater than 566° C. [1050° F.]), they still were colorless by the ASTM Color test.

All of the publications, patents and patent applications cited in this application are herein incorporated by reference in their entirety to the same extent as if the disclosure of each individual publication, patent application or patent was specifically and individually indicated to be incorporated by reference in its entirety.

Many modifications of the exemplary embodiments of the invention disclosed above will readily occur to those skilled in the art. Accordingly, the invention is to be construed as including all structure and methods that fall within the scope of the appended claims.

What is claimed is:

1. A process to prepare a heat transfer oil, comprising:
   a. dewaxing a substantially paraffinic wax feed by hydroisomerization dewaxing using a shape selective intermediate pore size molecular sieve under hydroisomerization conditions including a hydrogen to feed ratio from about 712.4 to about 3562 liter $H_2$/liter oil (about 4 to about 20 MSCF/bbl), whereby a lubricating base oil is produced,
   b. selecting one or more fractions of the lubricating base oil having:
      i. a pour point less than −9° C.,
      ii. a 50 wt % boiling point greater than 566° C.,
      iii. greater than 10 weight percent and less than 70 weight percent total molecules with cycloparaffinic functionality, wherein the one or more fractions have at least 31.2 wt % 1-unsaturations by FIMS, and iv. a ratio of weight percent molecules with monocycloparaffinic functionality to weight percent molecules with multicycloparaffinic functionality greater than 15; and
c. blending the one or more fractions of the lubricating base oil with less than 0.2 wt % antifoam agent to prepare the heat transfer oil of an ISO viscosity grade selected from the group of ISO 10, ISO 15, ISO 22, ISO 46, ISO 68, ISO 100, ISO 150, and ISO 220.

2. The process of claim 1, wherein the heat transfer oil has an auto ignition temperature greater than 329° C. (625° F.).

3. The process of claim 1, wherein the heat transfer oil has an auto ignition temperature greater than an amount defined by the equation: AIT=1.6×(Kinematic Viscosity at 40° C., in cSt)+300, in degrees Celsius.

4. The process of claim 1, wherein the substantially paraffinic wax feed is Fischer-Tropsch derived.

5. The process of claim 1 wherein the one or more fractions comprise at least 33.31 wt % of the heat transfer oil.

6. The process of claim 1, wherein the feedstock for the Fischer-Tropsch process comprises biomass, natural gas, coal, shale oil, petroleum, municipal waste, derivatives of these, or combinations thereof.

7. The process of claim 1, wherein the one or more fractions are two fractions.

8. The process of claim 1, wherein the heat transfer oil comprises from 0.038 to less than 0.2 wt % antifoam agent.

9. The process of claim 1, wherein the heat transfer oil has a Ramsbottom carbon residue of 0.04 wt % or less.

10. The process of claim 1, wherein the antifoam agent is selected from the group consisting of high molecular weight polydimethyl siloxane, acrylate, and mixtures thereof.

11. The process of claim 1, wherein the heat transfer oil has a 5 wt % boiling point greater than an amount defined by 1.3×(the ISO viscosity grade)+360, in ° C.

12. The process of claim 1, wherein the heat transfer oil has an ASTM Color of 0.

13. The process of claim 1, wherein the one or more fractions have from 28.3 to 70 wt % total molecules with cycloparaffinic functionality.

14. The process of claim 1, wherein the one or more fractions have greater than 35 wt % total molecules with cycloparaffinic functionality.

15. A process to prepare a heat transfer oil, comprising:
a. selecting one or more fractions of a lubricating base oil having:
i. a pour point less than −9° C.,
ii. a 50 wt % boiling point greater than 566° C., and
iii. a traction coefficient less than or equal to 0.015, when measured at a kinematic viscosity of 15 cSt and at a slide to roll ratio of 40 percent; and
b. blending the one or more fractions of the lubricating base oil with less than 0.2 wt % antifoam agent to prepare a heat transfer oil having an auto ignition temperature greater than 329° C. (625° F.) and an ASTM Color less than 0.5.

16. The process of claim 15, wherein the ASTM Color is 0.

17. The process of claim 15, wherein the traction coefficient is less than 0.011.

18. The process of claim 15, wherein the one or more fractions of the lubricating base oil have a kinematic viscosity at 100° C. of 14 cSt or higher.

19. The process of claim 15, wherein the one or more fractions of the lubricating base oil have a viscosity index greater than 150.

20. The process of claim 15, comprising blending the one or more fractions of the lubricating base oil with from 0 to 0.038 wt % antifoam agent.

* * * * *